(12) United States Patent
Miyata et al.

(10) Patent No.: US 8,007,945 B2
(45) Date of Patent: Aug. 30, 2011

(54) FUEL-CELL SYSTEM AND METHOD FOR SCAVENGING FUEL CELL

(75) Inventors: Koichiro Miyata, Utsunomiya (JP); Chihiro Wake, Shioya-gun (JP); Jumpei Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 795 days.

(21) Appl. No.: 11/498,373

(22) Filed: Aug. 3, 2006

(65) Prior Publication Data
US 2007/0031711 A1    Feb. 8, 2007

(30) Foreign Application Priority Data
Aug. 8, 2005 (JP) ................... 2005-229030

(51) Int. Cl.
*H01M 8/04* (2006.01)
(52) U.S. Cl. ......... 429/429; 429/400; 429/428; 429/443
(58) Field of Classification Search .................... 429/13, 429/429
See application file for complete search history.

(56) References Cited

U.S. PATENT DOCUMENTS

| | | | |
|---|---|---|---|
| 2005/0053814 A1* | 3/2005 | Imamura et al. | 429/22 |
| 2005/0214605 A1* | 9/2005 | Saitoh et al. | 429/22 |

FOREIGN PATENT DOCUMENTS

| | | |
|---|---|---|
| JP | 2001-338671 | 12/2001 |
| JP | 2002-313395 | 10/2002 |
| JP | 2003-104707 | 4/2003 |
| JP | 2004-265684 | 9/2004 |

OTHER PUBLICATIONS

Japanese Office Action for Application No. 2005-229030, dated Mar. 22, 2011.

* cited by examiner

*Primary Examiner* — Ula C Ruddock
*Assistant Examiner* — Patricia Davis
(74) *Attorney, Agent, or Firm* — Nelson Mullins Riley & Scarborough LLP; Anthony A. Laurentano

(57) ABSTRACT

A fuel-cell system 1 includes: a fuel cell 13 configured to generate electricity through reaction between hydrogen gas and air; a compressor 12 configured to supply air as a scavenging gas to a reactant gas path 13a of the fuel cell 13; a control part 18 configured to control an amount of air supplied from the compressor 12 to the fuel cell 13 to perform scavenging of the fuel cell 13; and pressure sensors P1 and P2 configured to monitor a pressure drop in the reactant gas path 13a of the fuel cell 13. The control part 18 controls an amount of supplied air so as to keep the pressure drop in the reactant gas path 13a substantially constant when the fuel cell 13 is scavenged. With this configuration, residual water can be suitably purged from the fuel cell while energy consumption is suppressed.

7 Claims, 4 Drawing Sheets

US 8,007,945 B2

FUEL-CELL SYSTEM AND METHOD FOR SCAVENGING FUEL CELL

CROSS-REFERENCE TO RELATED APPLICATIONS

This application claims the foreign priority benefit under Title 35, United States Code, §119 (a)-(d), of Japanese Patent Application No. 2005-229030, filed on Aug. 8, 2005 in the Japan Patent Office, the disclosure of which is herein incorporated by reference in its entirety.

BACKGROUND OF THE INVENTION

1. Field of the Invention

The present invention relates to a fuel-cell system for purging residual water from a fuel cell and a method for scavenging a fuel cell.

2. Description of the Related Art

In general, a fuel cell includes a cathode zone and an anode zone, between which a proton-conducting solid polymer electrolyte membrane (PEM) is sandwiched. The cathode and the anode are supplied with air and hydrogen, respectively, and electricity is generated by electrochemical reaction between oxygen in air and hydrogen. In such a fuel cell, water is also generated as a result of electrochemical reaction between oxygen and hydrogen. During a cold season or in cold districts, if an operation of the fuel cell is terminated with the generated water remaining in the fuel cell and the fuel cell is not operated for a log period of time, the water may be frozen. In order to solve this problem, a method for scavenging a fuel cell has been known in which dry air is supplied to a fuel cell when an operation of the fuel cell is terminated, to thereby purge residual water from a fuel cell (see Japanese Patent Application Laid-Open Specification Kokai No. 2004-265684A, paragraphs 0030-0034 and FIG. 1).

According to this method, by scavenging an interior atmosphere of the fuel cell with dry air, residual water in the fuel cell can be suitably purged. In this method, an initial amount of the residual water is large, and the amount decreases as the purging proceeds. In response to the change in the amount of the residual water, it is considered to be desirable that a front-back differential pressure of the fuel cell (a difference in pressure between the inlet side and the outlet side, or a pressure drop) be controlled in such manner that the differential pressure initially becomes high and is gradually decreased, as shown in FIG. 4. Especially in this method, it is proposed that a flow rate of air supplied to the fuel cell be kept constant by controlling a compressor, in order to efficiently purge the residual water.

In the case of such a control in which an air flow rate is kept constant, a pressure drop becomes larger when an amount of residual water in the fuel cell becomes larger, leading to an increase in energy consumption in the compressor. There is a disadvantage in that the residual water is not efficiently purged, considering the increase in the energy consumption.

Therefore, it would be desirable to provide a fuel-cell system and a method for scavenging a fuel cell, in which residual water can be suitably purged from the fuel cell while energy consumption is suppressed.

SUMMARY OF THE INVENTION

In an aspect of the present invention, there is provided a fuel-cell system which comprises: a fuel cell configured to generate electricity by reaction of reactant gases; a scavenging gas-supply device for supplying scavenging gas to a reactant gas path of the fuel cell; a scavenging performing device for controlling an amount of the scavenging gas supplied from the scavenging gas-supply device to the fuel cell to perform scavenging of the fuel cell; and a pressure drop monitoring device for monitoring a pressure drop of the reactant gas path of the fuel cell, the scavenging performing device controlling an amount of the scavenging gas so as to keep the pressure drop in the reactant gas path substantially constant, when the fuel cell is scavenged.

In another aspect of the present invention, there is provided a method for scavenging a fuel cell with scavenging gas comprising: a step of monitoring pressure drop in a reactant gas path of the fuel cell, and a step of controlling an amount of the supplied scavenging gas so as to keep the monitored pressure drop substantially constant.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described in detail below with reference to the accompanying drawings.

The term "keep a pressure drop nearly (substantially) constant" used herein means that the pressure drop is kept nearly constant at a predetermined small value. The "predetermined small value" is arbitrarily selected, however, the value should be selected so as to make the total energy consumption smaller than the conventional value in order to solve the above-mentioned problem, and desirably, the value is set at the minimum that is capable of removing residual water in the fuel cell. The expression "monitoring a pressure drop" may include not only directly measuring pressures on an inlet side and an outlet side of a reactant gas path using sensors, but also estimating a pressure drop from other parameters, such as a flow rate of a scavenging gas.

Figure 1:
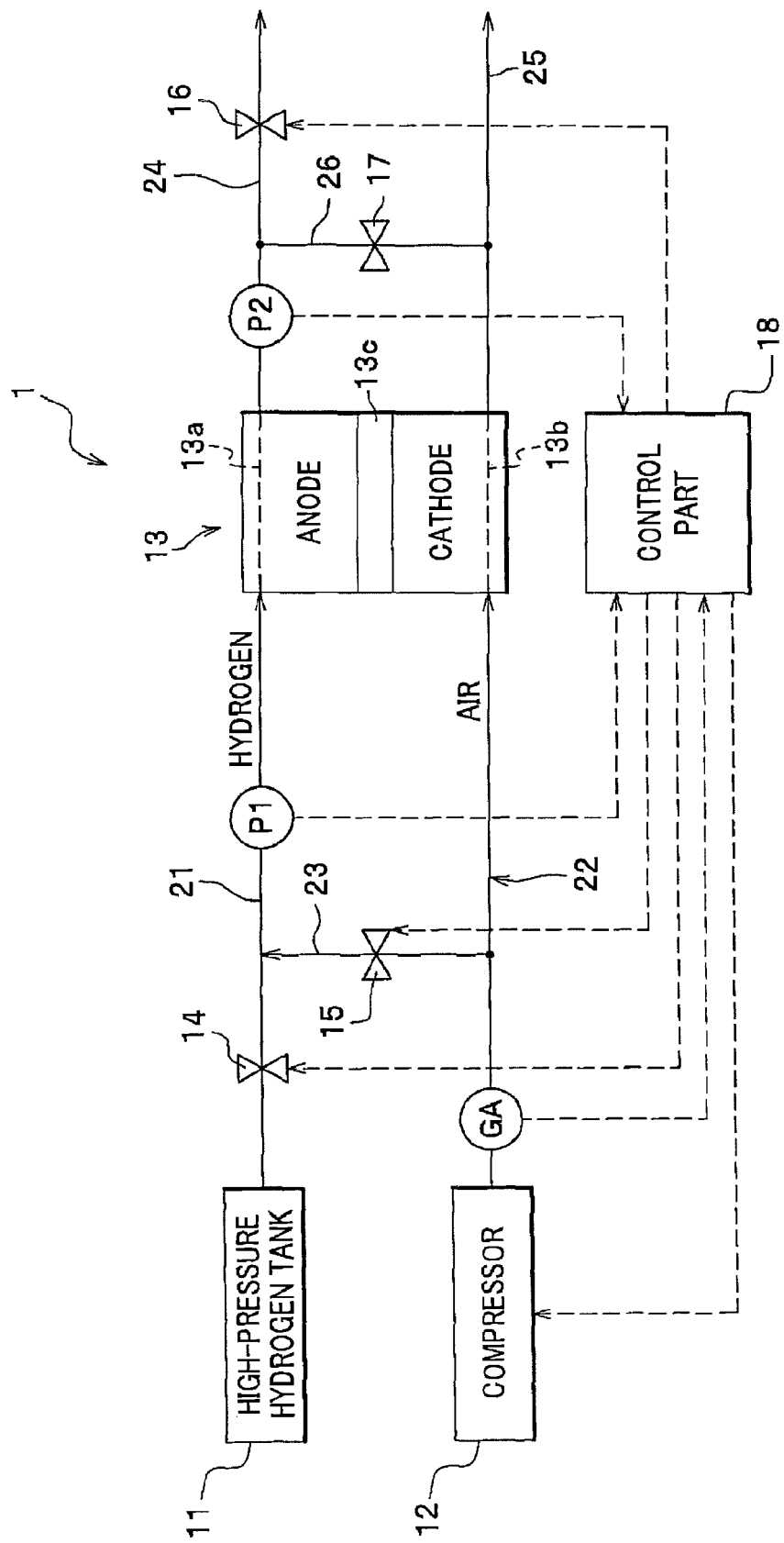
FIG. 1 is a configuration diagram of a fuel-cell system according to the present invention.

Referring to FIG. 1, a fuel-cell system 1 mainly includes a high-pressure hydrogen tank 11, a compressor (air-supply device, scavenging gas-supply device) 12, a fuel cell 13, a shutoff valve 14, an air-introduction valve 15, a hydrogen-purge valve 16, an air-exhaust valve 17 and a control part (scavenging performing device) 18.

In the high-pressure hydrogen tank 11, hydrogen gas (reactant gas) pressurized to several tens of MPa is stored, and the hydrogen gas can be supplied to the fuel cell 13 by opening the shutoff valve 14. Between the high-pressure hydrogen tank 11 and the fuel cell 13, a tubular fuel gas-supply path 21 is provided as a pathway for hydrogen gas, on which the shutoff valve 14 and a pressure sensor (pressure drop monitoring device) P1 are disposed in this order, in a direction from the high-pressure hydrogen tank 11 to the fuel cell 13. On an outlet side of the fuel cell 13, a tubular fuel gas-exhaust path 24 is provided, on which a pressure sensor (pressure drop monitoring device) P2 and the hydrogen-purge valve 16 are disposed in this order, in a direction from the fuel cell 13 to a downstream of the fuel-cell system 1.

The pressure sensors P1 and P2 measure pressures of an inlet side and the outlet side of the fuel cell 13 (on anode side), respectively, at least during scavenging of the fuel cell 13, and output the pressures as signals to indicate "pressure drop (front-back differential pressure of the fuel cell 13)" to the control part 18. The hydrogen-purge valve 16 is properly opened or closed by the control part 18, and a diluter (not shown) may be optionally disposed downstream of the hydrogen-purge valve 16.

The compressor 12 is configured to compress oxidant gas-containing air (reactant gas) and to supply the compressed air to the fuel cell 13. Between the compressor 12 and the fuel cell 13, a tubular air-supply path 22 is provided as a pathway for air, on which a flowmeter GA is disposed for measuring a flow rate of air flowing inside the air-supply path 22. The flowmeter GA measures a flow rate of air supplied to the fuel cell 13 at least during scavenging of the fuel cell 13, and outputs a signal indicating the measured flow rate to the control part 18. On a cathode side outlet of the fuel cell 13, a tubular air-exhaust path 25 is provided, on which a back-pressure valve (not shown) is disposed for properly adjusting pressure of air supplied to the cathode of the fuel cell 13.

The fuel cell 13 generates electricity by electrochemical reaction between hydrogen gas supplied from the high-pressure hydrogen tank 11 and air supplied from the compressor 12. Specifically, the fuel cell 13 generates electricity by subjecting reactant gases (hydrogen gas and air) to electrochemical reaction through a solid polymer electrolyte membrane 13c, when hydrogen gas and air pass reactant gas paths 13a and 13b formed in the fuel cell 13, respectively. It should be noted that, as one consequence of electrochemical reaction between hydrogen gas and air, water is generated in the anode and the cathode.

The shutoff valve 14 switches between supplying and blocking of hydrogen gas from the high-pressure hydrogen tank 11 to the fuel cell 13, opening and closing of which valve are properly controlled by the control part 18.

The air-introduction valve 15 is properly opened or closed by the control part 18 and disposed on a scavenging path 23 connecting the air-supply path 22 with the fuel gas-supply path 21 at a portion between the shutoff valve 14 and the pressure sensor P1. When the air-introduction valve 15 is closed, air from the compressor 12 is supplied to only the cathode of the fuel cell 13 through the air-supply path 22; when the air-introduction valve 15 is opened, air from the compressor 12 is supplied to the cathode of the fuel cell 13, as well as to the anode of the fuel cell 13 as a scavenging gas through the scavenging path 23 and the fuel gas-supply path 21. In the latter case, the shutoff valve 14 is controlled to be closed.

The air-exhaust valve 17 is disposed on a scavenging gas-exhaust path 26 connecting the fuel gas-exhaust path 24 with the air-exhaust path 25. By opening the air-exhaust valve 17 and the air-introduction valve 15, the anode of the fuel cell 13 is scavenged.

Figure 4:
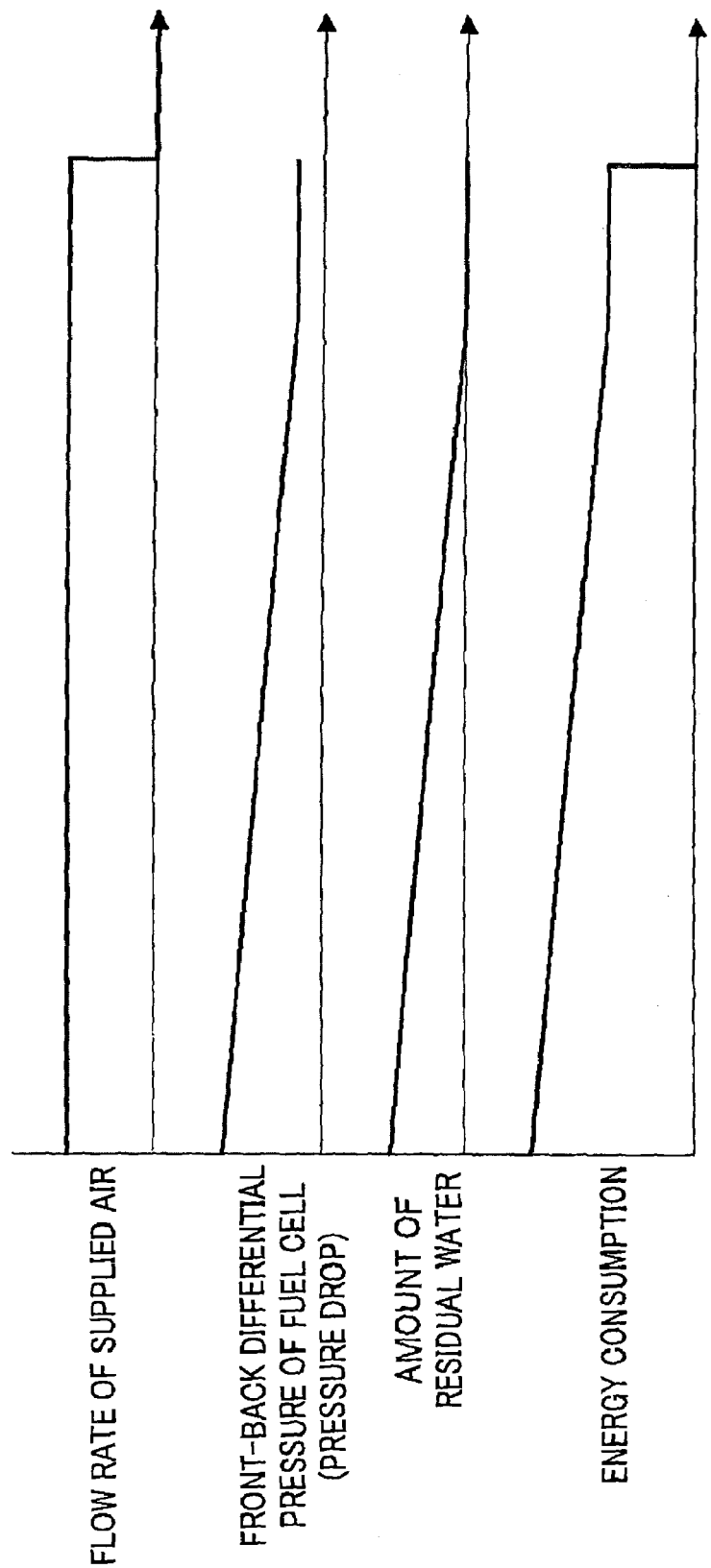
FIG. 4 is a time chart showing transitions of air flow rate, front-back differential pressure, amount of residual water and energy consumption, during conventional scavenging.

The control part 18 has a function of determining as to whether scavenging of the anode of the fuel cell 13 should be performed, for example, when receiving a request to terminate the generation of electricity, such as a signal put out by turning off an ignition switch by an operator. When the control part 18 determines scavenging of the anode, the control part 18 opens the air-introduction valve 15 and the air-exhaust valve 17 as mentioned above, and at the same time calculates a pressure drop in the reactant gas path 13a based on signals from the pressure sensors P1 and P2. The control part 18 also has a function of adjusting an amount of supply air (scavenging gas) by controlling the compressor 12 so as to keep the pressure drop nearly constant at a predetermined small value. It should be noted that the value of the pressure drop can be arbitrarily selected, and in the present embodiment, the value is set at a value obtained when residual water disappears under the conventional control shown in FIG. 4. It was empirically confirmed that, even when the pressure drop was set at such a small predetermined value, residual water in the anode was suitably purged (the same level of purging effect was obtained as in the conventional case).

Next, the control part 18 of the fuel-cell system 1 according to the present embodiment will be described below.

Figure 2:
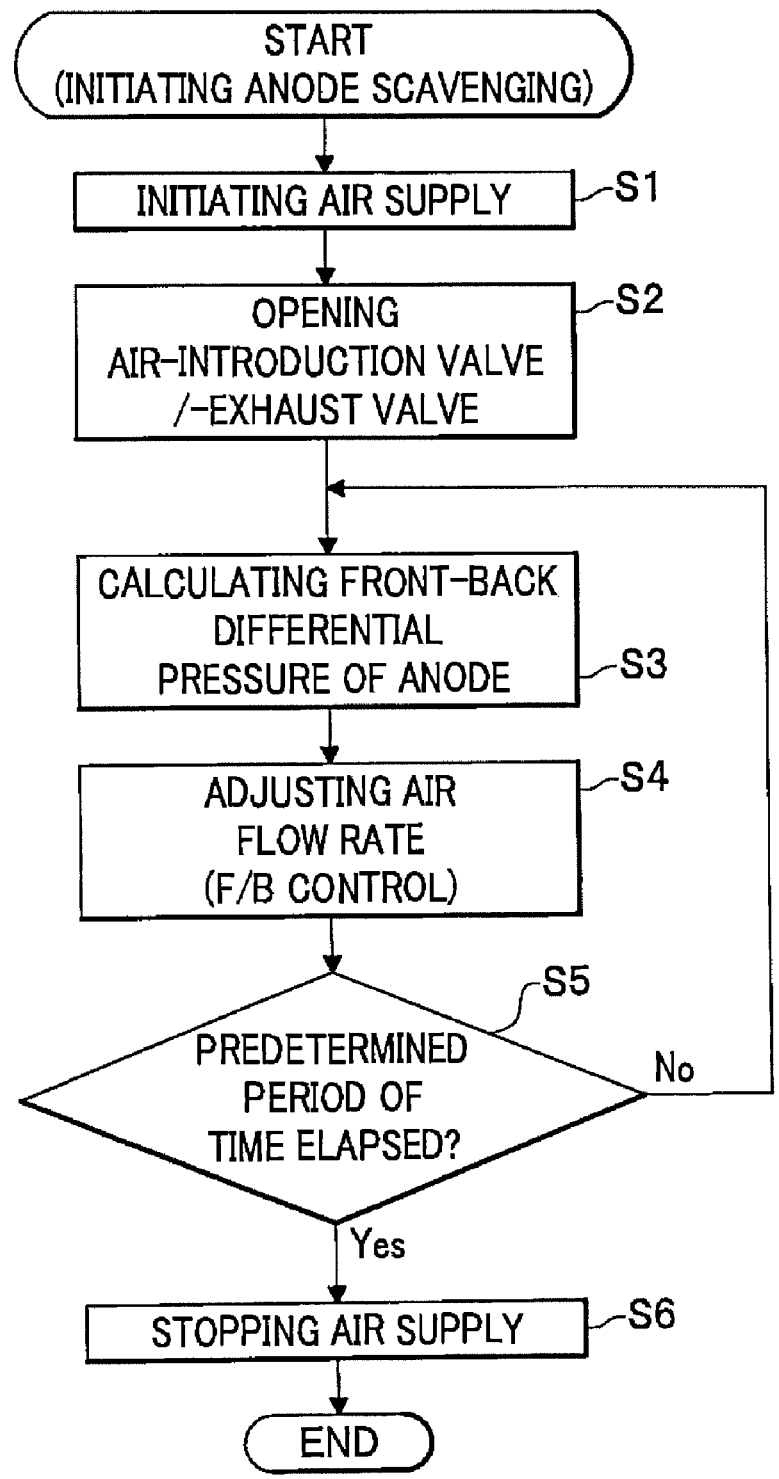
FIG. 2 is a flow chart showing operation of a control part.
Figure 3:
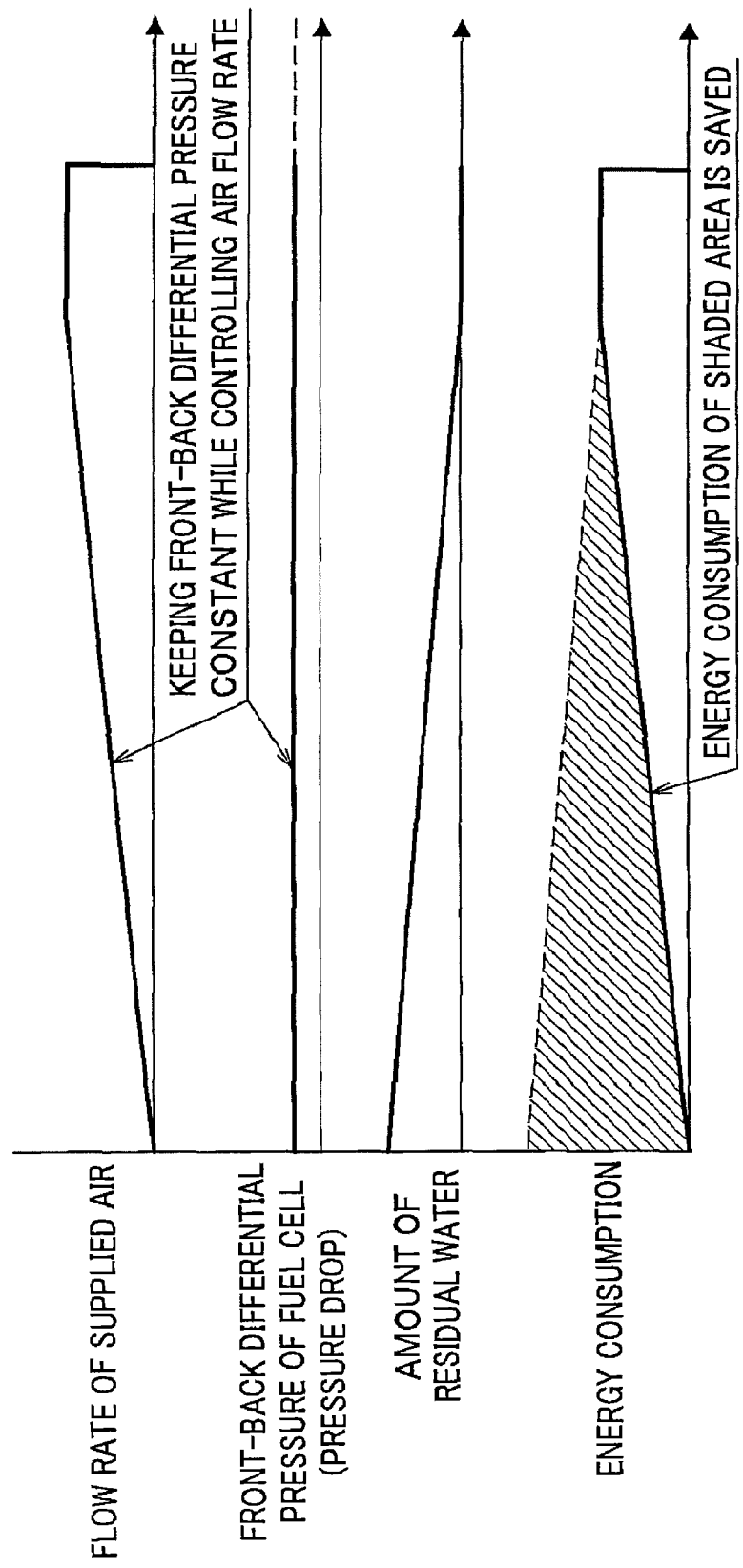
FIG. 3 is a time chart showing transitions of air flow rate, front-back differential pressure, amount of residual water and energy consumption, during scavenging of an anode.

As shown in FIG. 2, when the control part 18 determines scavenging of the anode (START), the control part 18 drives the compressor 12 (step S1) and opens the air-introduction valve 15 and the air-exhaust valve 17 (step S2). Next, the control part 18 calculates a pressure drop (front-back differential pressure of the anode) based on signals from the pressure sensors P1 and P2 (step S3) and adjusts a flow rate of air supplied from the compressor 12 to the fuel cell 13 by controlling the compressor 12 so as to keep the pressure drop nearly constant (step S4). Specifically, as shown in FIG. 3, by keeping the pressure drop nearly constant, an air flow rate is adjusted to gradually increase after an initiation of scavenging. With this configuration, energy consumption (obtained by multiplying air flow rate by pressure drop) is remarkably suppressed as compared with the conventional case shown in FIG. 4.

After the step S4, the control part 18 determines whether a predetermined period of time has elapsed (step S5), and when the predetermined period of time has not elapsed (No), the steps S3 and S4 are repeated. When the control part 18 determines at the step S5 that the predetermined period of time has elapsed (Yes), the compressor 12 is stopped and the air-introduction valve 15 and the air-exhaust valve 17 are closed to thereby terminate the supply of air to the anode (step S6), which in turn terminates the operation of scavenging of the fuel cell 13 (END). It should be noted that the "predetermined period of time" may be arbitrarily selected from a time range that can attain disappearance of residual water. However, in order to avoid increase in energy consumption, it is preferred that the timing be set relatively short period after the moment residual water disappears.

Following effects can be attained by the fuel system according to the embodiments described above:

Since the amount of supplied scavenging gas is controlled so as to keep the pressure drop in the reactant gas path 13a of the fuel cell 13 nearly constant at a predetermined small value, residual water can be suitably purged from the fuel cell 13 while energy consumption is suppressed as compared with a case of the conventional control in which a pressure drop is set high when scavenging is initiated. There is also an advantage in that, by setting a pressure drop to small value, a load on the solid polymer electrolyte membrane 13c of the fuel cell 13 can be reduced.

Since scavenging is performed when the generation of electricity by the fuel cell 13 is terminated, electricity can be stably generated upon an initiation of a next operation. It should be noted that the expression "when the generation of electricity by the fuel cell is terminated" may include immediately after and a certain period of time after the termination of electricity generation.

Since the compressor 12 (air-supply device) which supplies air as a fuel to the fuel cell 13 can be utilized as a scavenging gas-supply device, the number of apparatus is reduced, and a system can be made downsized.

From the aforementioned explanation, those skilled in the art ascertain the essential characteristics of the present invention and can make the various modifications and variations to the present invention to adapt it to various usages and conditions without departing from the spirit and scope of the claims.

In the embodiment above, the compressor 12 is used as a scavenging gas-supply device. However, the present invention is not limited to this embodiment, and for example, nitrogen can be used as a scavenging gas and a nitrogen tank configured to store nitrogen can be used as a scavenging gas-supply device. In this case, an amount of the scavenging gas supplied to the fuel cell can be adjusted by properly controlling a valve configured to adjust a flow rate of nitrogen.

In the embodiment above, two pressure sensors P1 and P2 provided on the inlet side and the outlet side of the fuel cell 13, respectively, are used as pressure drop monitoring device. However, the present invention is not limited to this embodiment, and a pressure drop may be estimated based on, for example, an air flow rate measured by a flowmeter GA described in the above-mentioned embodiment; an amount of electricity generated by the fuel cell 13; and an amount of residual water estimated from an operating time. According to these examples, two pressure sensors P1 and P2 can be omitted, leading to smaller number of parts, and thus cost can be reduced.

In the embodiment above, the present invention is applied to scavenging of the anode. However, the present invention is not limited to the anode, and may be applied to scavenging of the cathode. Specifically, in the case where scavenging of the anode is not necessary while scavenging of the cathode is necessary, energy consumption is also suppressed by conducting a control in a similar manner to the above-mentioned embodiment, with the air-introduction valve 15 and the air-exhaust valve 17 being closed.

What is claimed is:

1. A method for scavenging a fuel cell with scavenging gas comprising:
    a step of monitoring a first pressure at a fuel gas inlet of the fuel cell and a second pressure at a fuel gas outlet of the fuel cell to determine a pressure drop in a fuel gas path of the fuel cell, the pressure drop being defined as a pressure difference between the first pressure and the second pressure, and
    a step of controlling an amount of the supplied scavenging gas so as to keep the pressure drop substantially constant, while scavenging is performed, for suppressing energy consumption during the process of scavenging,
    wherein the step of controlling comprises increasing a flow rate of the scavenging gas gradually after an initiation of scavenging to keep the pressure drop substantially constant while scavenging is performed.

2. The method according to claim 1, wherein the scavenging is performed when a generation of electricity by the fuel cell is terminated.

3. The method according to claim 1, wherein the pressure drop is kept substantially constant at a predetermined small value.

4. The method according to claim 3, wherein the predetermined small value is set at a minimum that is capable of removing residual water in the fuel gas path.

5. The method according to claim 1, wherein the step of monitoring pressure drop comprises measuring pressures in the fuel gas path on an inlet side and an outlet side of the fuel cell and obtaining a difference between the pressures.

6. The method according to claim 1, wherein oxidant gas-containing air is used as a reactant gas and the air is used as the scavenging gas when the scavenging is performed.

7. A method according to claim 1, wherein the amount of the supplied scavenging gas is controlled to keep the first pressure substantially the same as the second pressure.

* * * * *